(12) United States Patent
Fujimoto

(10) Patent No.: US 7,546,068 B2
(45) Date of Patent: Jun. 9, 2009

(54) RESIN-MADE HOLDING MEMBER AND TONER CARTRIDGE

(75) Inventor: Ryoichi Fujimoto, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 261 days.

(21) Appl. No.: 11/697,919

(22) Filed: Apr. 9, 2007

(65) Prior Publication Data

US 2007/0243743 A1    Oct. 18, 2007

(30) Foreign Application Priority Data

Apr. 12, 2006   (JP) .............................. 2006-109458

(51) Int. Cl.
    *G03G 15/08* (2006.01)
(52) U.S. Cl. ..................... 399/262; 399/120
(58) Field of Classification Search ................. 399/107, 399/119, 120, 252, 258, 262; 222/DIG. 1
    See application file for complete search history.

(56) References Cited

U.S. PATENT DOCUMENTS 6,334,035 B1 * 12/2001 Abe et al. .................... 399/106
7,447,470 B2 * 11/2008 Lee ............................. 399/262

FOREIGN PATENT DOCUMENTS

| JP | 740514 | 7/1995 |
|---|---|---|
| JP | 11-272054 | * 10/1999 |
| JP | 2000213455 | 8/2000 |

* cited by examiner

*Primary Examiner*—Hoan H Tran
(74) *Attorney, Agent, or Firm*—Lucas & Mercanti, LLP

(57) ABSTRACT

A resin-made holding member made of an integrally built spring and holder wherein the spring is made up of a plurality of ring-shaped elastic pieces connected with one another, and the average wall thickness of each elastic piece at the end in the longest axial direction of inner diameter of the ring shape is greater than the average wall thickness of other portions.

15 Claims, 5 Drawing Sheets

FIG. 3 ( a )
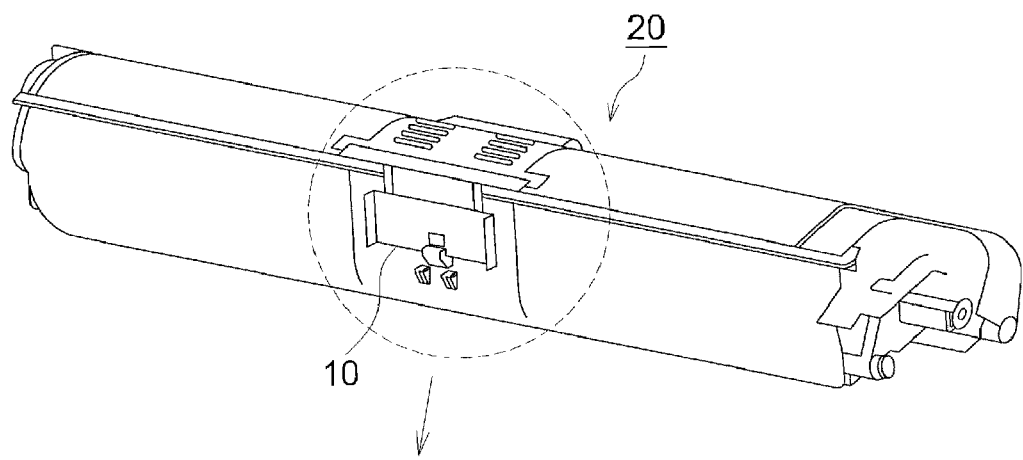
FIG. 3 ( b )
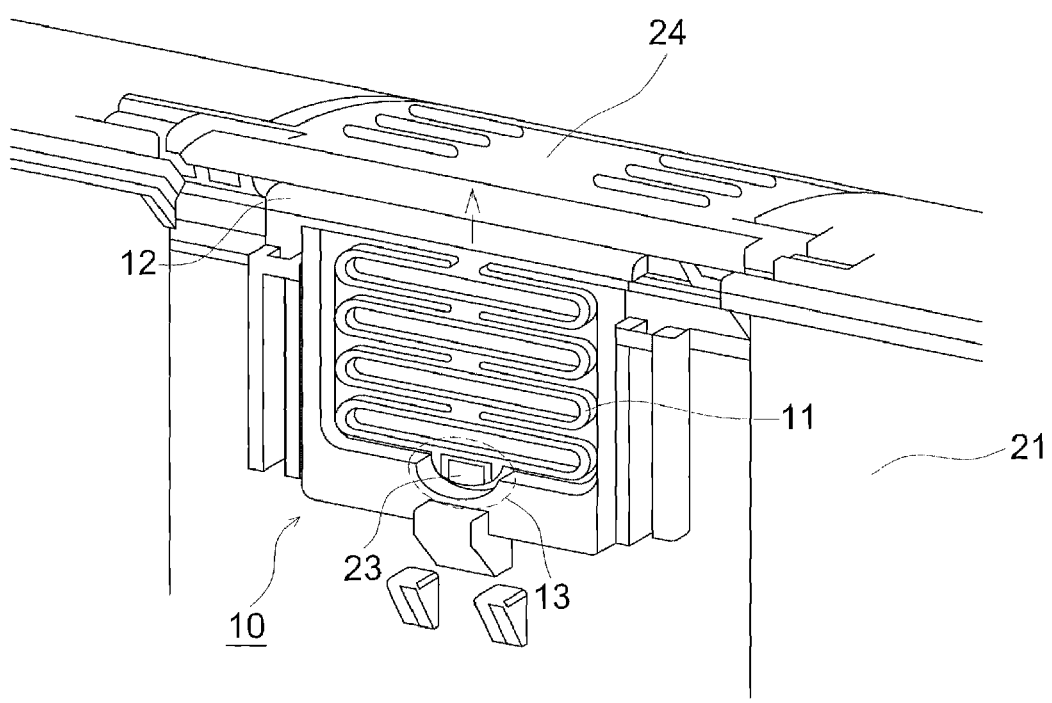

US 7,546,068 B2

RESIN-MADE HOLDING MEMBER AND TONER CARTRIDGE

BACKGROUND OF THE INVENTION

The present invention relates to a resin-made holding member made up of a spring and a holder for holding the spring which are integrally formed into one piece and a toner cartridge using the resin-made holding member.

A metallic coil spring installed in the resin-made holder is often used as the holding member that uses an elastic force for holding. FIGS. 5(a) and 5(b) show an example of the holding member using such a metallic coil spring. When manufacturing such a holding member, it is necessary to install a metallic coil spring on the resin-made holder. A member of smaller size adversely affects the productivity because of the time and labor required for installation. This problem has been left unsolved in the conventional art.

To solve this problem, efforts have been made to study the art of using a resin-made spring from the viewpoint of improving the productivity. One of the technologies based on a resin-made spring is found in the art of related to a dispenser such as shampoo container using a spring called the return spring made up of a plurality of elastic pieces integrally combined with one another, each piece having a restoring force (e.g., Patent Document 1).

However, the shape of the elastic pieces constituting the spring having been disclosed in the Patent Document 1 has been examined by the present inventors, and the following has been found out. The wall thickness on both ends of the piece to which the greatest force is considered to be applied at the time of contraction is smaller than those of other parts. If used for a long period of time, this portion is considered to be easily damaged. As described above, the resin-made spring disclosed in the Patent Document 1 has failed to give consideration to the fact that the spring should not be damaged even when constantly subjected to loads for a long period of time.

[Patent Document 1] Japanese Utility Model Application Publication No. 7-40514

SUMMARY

An object of the present invention is to provide a resin-made holding member having a resin-made spring characterized by excellent durability and resistance to damage, wherein this holding member is used for a long period of time under contracted conditions while the force is being applied to the spring.

The present inventors have found out that the aforementioned problems can be solved by the following structures:

1. A resin-made holding member made up of a spring and holder integrally combined with each other, and the spring is formed of a plurality of ring-shaped elastic pieces connected with one another, wherein each elastic piece is formed so that the average wall thickness on both ends in the longest axis direction of inner diameter of the ring shape is greater than the average wall thickness of other portions.

2. A toner cartridge including a resin-made holding member made up of a spring and holder integrally combined with each other, and the spring is formed of a plurality of ring-shaped elastic pieces connected with one another, wherein each elastic piece is formed so that the average wall thickness on both ends in the longest axis direction of inner diameter of the ring shape is greater than the average wall thickness of other portions.

BRIEF DESCRIPTION OF THE DRAWINGS

FIG. 3(a) is a schematic diagram showing an example of using a resin-made holding member in the present invention.

FIG. 3(b) is an enlarged diagram around the use portion of the resin-made holding member.

DETAILED DESCRIPTION OF THE PREFERRED EMBODIMENT

The present invention relates to a resin-made holding member made up of a spring and a holder for holding the spring which are integrally formed in one piece and a toner cartridge using the resin-made holding member.

Figure 1A:
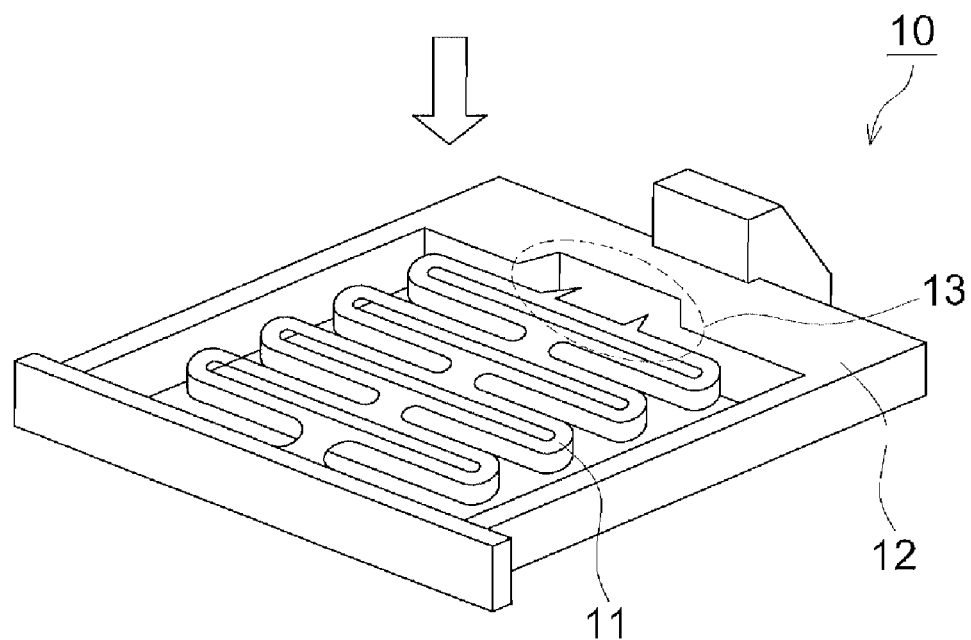
FIGS. 1(a) and 1(b) are schematic diagrams representing the resin-made holding member containing a spring and a holder integrated with each other.
Figure 1B:
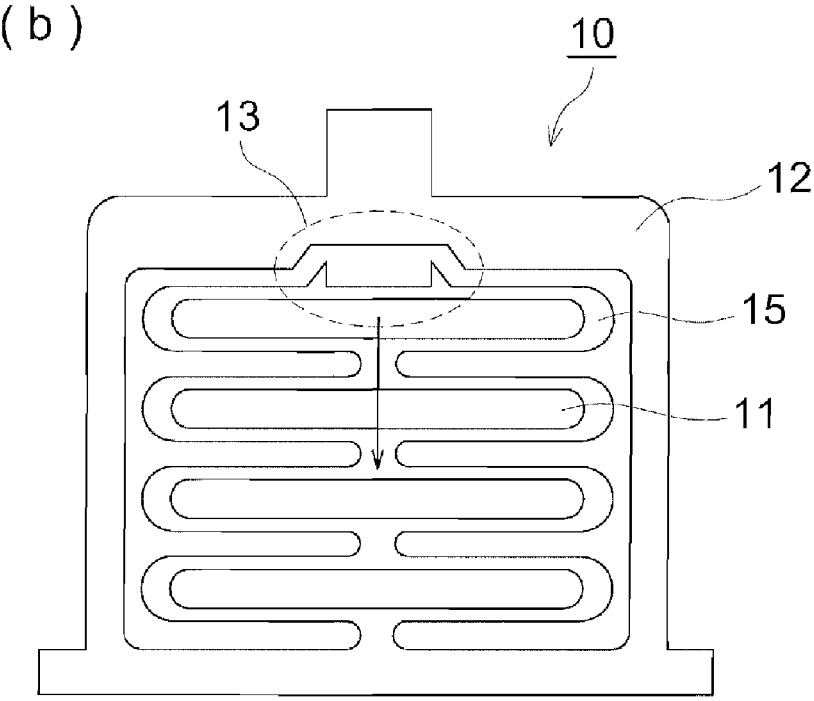

FIGS. 1(a) and 1(b) are schematic diagrams representing the resin-made holding member containing a spring and a holder integrally formed with each other. FIG. 1(a) is a perspective view of a holding member 10, and FIG. 1(b) is a front view of the holding member 10 as viewed from the arrow-marked direction in FIG. 1(a).

As shown in FIGS. 1(a) and 1(b), the holding member 10 is made up of a spring portion 11 and a holder portion 12 for holding the spring 11. A member holding section 13 for holding a member is provided between the spring portion 11 and holder portion 12. The member holding section 13 is formed of a protrusion on the elastic piece 15 side constituting the spring portion 11 and a recess on the holder portion 12 side. When the spring portion 11 is contracted in the arrow-marked direction of the drawing, there is an increase in the space between the protrusion and the recess. Then a member is inserted in this space and is held in position. As is apparent from the foregoing description, the method of holding the member in the present invention is realized by contraction of the spring portion 11.

Figure 2:
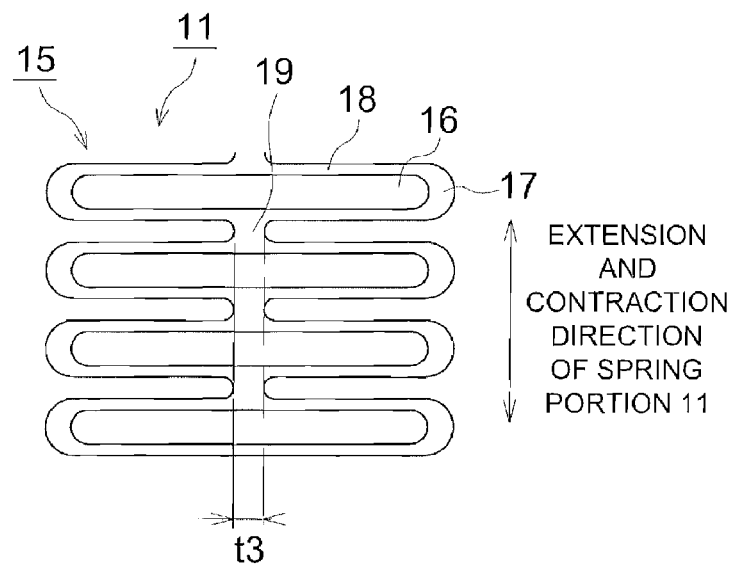
FIG. 2(a) is a schematic diagram showing a spring.
FIG. 2(b) is a partially enlarged diagram of the spring.
Figure 2:
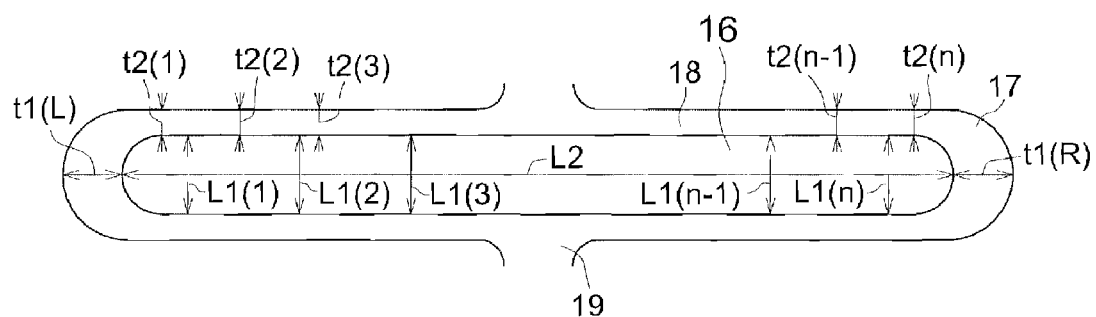

The following describes the spring portion constituting the resin-made holding member 10 of the present invention. FIG. 2(a) is a partial view of the spring portion 11 constituting the resin-made holding member 10 of the present invention. As shown in FIG. 2(a), the spring portion 11 is formed of a plurality of track-shaped elastic pieces 15 connected integrally in one piece through connections 19. That is, in the present invention, this spring portion 11 is integrated by fixing with the connection 19 and the structure is repeated to construct the spring portion 11.

The track-shaped mentioned here is a shape formed of two parallel straight lines and two curved lines connecting the straight lines such as the shape of a track used for the track and field competition. The elastic piece 15 can be any ring-shape and is not limited to the track-shape used for an example here. Specifically, the ring shape of the ring-shaped elastic piece can be exemplified to be elliptic, track-shaped, and parallelogramatic (may include a curved line at an end).

As shown in FIG. 2(a), each of the track-shaped elastic pieces 15 constituting the spring portion 11 includes a hollow section 16, and is extended or contracted in the arrow-marked direction through the hollow section 16. To be more specific, when the spring portion 11 is contracted, the elastic piece 15 is transformed toward the hollow section 16, and is contracted.

In the elastic piece 15, the wall thickness on both ends 17 in the track-shape long axial direction and the wall thickness of the connection 19 are greater than those of other portions. As is apparent from the foregoing description, greater wall thicknesses of the ends 17 and connection 19 eliminate the possibility of deterioration or damage caused by deformation of the ends 17 and connection 19, even when the spring portion 11 being contracted is used for a long period of time. Further, this arrangement enhances the durability of the spring portion 11.

The degree of extension and contraction of the spring portion 11 can be controlled according to the size of the hollow section 16 constituting the elastic piece 15. As shown in FIG. 2(b), the size of the hollow section 16 is represented by the vertical width L1 and the longitudinal distance L2. In this case, the longitudinal distance L2 is the largest diameter of inner diameter of the hollow section 16 and regarded as the long axis. The vertical width L1 is the average $(\Sigma L1(n)/n)$ of inner diameters $L1(n)$ which are perpendicular to the longitudinal distance L2, that is, the long axis direction.

As shown in FIG. 2(b), assuming that the average of wall thickness of the both ends 17 constituting the elastic piece 15 on the extended line of the longitudinal distance L2, that is the long axis, is t1 (this means $(t1(L)+t1(R))/2=t1$), the wall thickness of the connection 19 is t3, and the average of wall thickness of the region 18 within the longitudinal distance L2, constituting the long axis direction of the elastic piece 15 is t2 (this means $\Sigma t2(n)/n=t2$), and the following relationship is established:

$$t1 > t2$$

$$t3 > t2$$

To put it specifically, the average wall thickness t1 of the ends 17 and the wall thickness t3 of the connection 19 are greater than 1.0 times the average wall thickness t2 of the region 18 constituting the long axial direction, and are smaller than 3.0 times the average wall thickness t2. To put it more specifically, when the average wall thickness of the region 18 of the elastic piece 15 constituting the long axial direction is 0.8 through 1.0 mm, the average wall thicknesses of the ends 17 and the wall thicknesses of connections 19 are preferably equal to or greater than 2.0 mm.

As a measuring method of the abovementioned dimensions L1, L2, t1 and t2, they can be measured with Digital microscope BS-D8000III made by Sonic Ltd in accordance with its operation manual. Briefly explained, when the dimensions L1, L2, t1 and t2 are measured by Digital microscope BS-D8000III, measurement menu is opened and then lens magnification ratio is selected. Calibration at the selected lens magnification ratio is then performed. Then, after the object to be measured dimensions is displayed on the screen, two points are designated on the screen. The distance between the two points designated on the screen for determine the dimension of L1, L2, t1 or t2 is measured The value t2 is obtained by calculation of the average after measuring thickness at arbitrary twenty (20) points within the longitudinal distance L2. Similarly, the vertical width L1 is obtained by calculation of the average after measuring distances at arbitrary twenty (20) points within the longitudinal distance L2.

When the vertical width L1 and the longitudinal distance L2 forming the hollow section 16 meets the following relationship, the advantages of the present invention are perfectly utilized. Namely, $$5 \leq L2/L1 \leq 15$$

When the vertical width L1 and longitudinal distance L2 of the hollow section 16 maintain the aforementioned relationship, the elastic piece 15 produces the adequate performance of extension and contraction. At the same time, it yields a sufficient durability against the contraction force received by the elastic piece 15. Thus, the elastic piece 15 provides a sufficient function as a spring.

The ends 17 of the elastic piece 15 constituting the spring portion 11 and the connections 19 for linking the elastic pieces 15 are preferably formed to have curved surfaces. As described above, if the ends 17 and connections 19 are formed to have curved surfaces, the force applied to the ends 17 and connections 19 can be dispersed adequately when the spring portion 11 is contracted. This eliminates the possibility of local fatigue and deterioration resulting from stress concentration at the ends 17 and connections 19.

No restriction is imposed on the resin material to be used as the resin-made holding member of the present invention, if it is capable of maintaining the condition without being damaged when used as an elastic piece under constantly contracted conditions. It is exemplified by polypropylene, high-density polyethylene, low-density polyethylene, high-impact polystyrene, acrylonitrile butadiene styrene (ABS) copolymer, polyoxymethylene, and polycarbonate. These resins can be used independently or in combination.

The physical properties of the resin material used as the resin-made holding member in the present invention are preferred to be such that the Young's modulus is 2000 through 2600 MPa, tensile yield strength is 25 through 65 MPa, and compressive yield strength is 40 through 100 MPa.

The Young's modulus can be measured by the conventional known method using a tensile viscoelastic property measuring apparatus and others. The measuring method using a tensile viscoelastic properties measuring apparatus is exemplified by the method wherein Model DMS 110 tensile viscoelastic properties measuring apparatus by Seiko Co., Ltd. is used to test a test piece having a length of 30 mm, a thickness of 3 mm and a width of 10 mm; the method wherein Model UMS-R tensile viscoelastic properties measuring apparatus by Toshiba Tungaloy Co., Ltd. is used to test a cylindrical test piece having a diameter of 25 mm and a height of 15 mm; and the method wherein Model UCT-5T Tensilon Universal Tester by Orientech Co., Ltd. is used to test a dumbbell No. 1 test piece (ASTM D638 Type I) produced by N100 molding machine made by Japan Steel Works, Ltd.

The tensile yield strength can be measured according to the JIS K7113, "Plastic material tensile test method". For example, it is possible to use the tensile test wherein a test piece 1A specified in the JIS K7162 is tested at a temperature of 23° C. and at a test speed of 10 mm/min.

The compressive yield strength can be measured according to the JIS K7208, "Plastic material compression test method". To put it more specifically, compression test is conducted with a compression test piece specified in JIS K7181 (a rectangular parallelepiped test piece measuring 20 mm by 40 mm by 2 mm) at a temperature of 23° C. at a compression speed of 10 mm/min.

Injection molding is a typical method of manufacturing the resin-made holding member of the present invention. Further, it can also be manufactured by cutting a resin solid or by using a press.

FIGS. 3(a) and 3(b) show an example of using the resin-made holding member 10 of the present invention. It shows an example of using it in a toner cartridge for supplying toner to the image forming apparatus based on electrophotographic technology. FIGS. 3(a) and 3(b) are overall views of the toner cartridge 20. The resin-made holding member 10 of the present invention is used while it is covered at the center of the cartridge. FIG. 3(b) is an enlarged view showing where the resin-made holding member 10 of the toner cartridge 20 is used. As shown in FIG. 3(b), the member holding section 13 of the resin-made holding member 10 is fitted to the protrusion 23 located at the center of the housing 21 of the toner cartridge 20, and a holder 12 is fixed between the upper end of the housing 21 and the grip 24 over the toner cartridge 20. As is apparent from this description, according to the arrangement of the member holding section 13 and the end of the holder 12, the spring portion 11 is fixed to the protrusion 23 of the housing 21 through the member holding section 13, and the end of the holder 12 presses the grip 24 in the arrow-marked direction.

When the toner cartridge 20 is mounted on the image forming apparatus, the claw of the member holding section 13 of the resin-made holding member 10 is fitted to the hole (not illustrated) on the housing on the image forming apparatus main body side, and the toner cartridge 20 is fixed at a predetermined position of the image forming apparatus main body.

Figure 4:
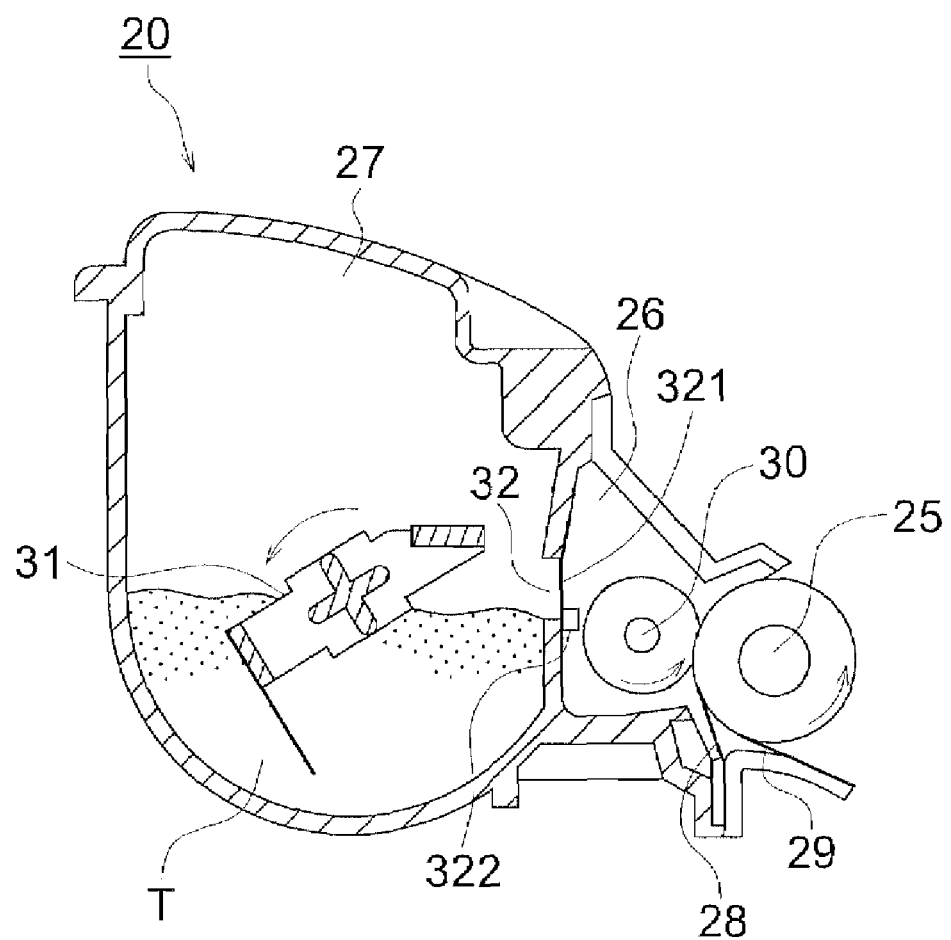
FIG. 4 is a schematic diagram showing the cross sectional structure of a toner cartridge.

The toner cartridge 20 has the cross section shown in FIG. 4, for example. The toner accommodated therein is supplied to the photoreceptor constituting the electrophotographic image forming apparatus, and the electrostatic latent image formed on the photoreceptor is developed. In this case, the toner cartridge 20 is driven by the motor provided on the image forming apparatus side. Incorporated in the image forming apparatus, the toner cartridge 20 supplies toner onto the photoreceptor by means of a development roller 25, which is arranged in contact with or close to the photoreceptor.

The toner cartridge 20 mounted on the image forming apparatus may be placed sometimes in an upside down position due to the rotation drive by the motor installed on the image forming apparatus side. Even when it is held in such a position, the grip 24 does not open because the grip 24 is held by the end of the holder 12 of the resin-made holding member 10 in the arrow-marked direction shown in FIG. 3(b).

Namely, the toner cartridge 20 is secured at a predetermined position of the image forming apparatus and is driven and rotated to provide development operation on the photoreceptor. In this case, the spring portion 11 pushes the grip 24 in the arrow-marked direction of FIG. 3(b) through the end of the holder 12, and the grip 24 is pressed against a predetermined position of the toner cartridge 20 by the force of the spring. This eliminates the possibility of misalignment being caused by rotation or vibration at the time of image formation.

Further, when the toner cartridge 20 is removed from the image forming apparatus, the operator pulls up the grip 24. Then a force in the direction opposite to the arrow-marked direction of FIG. 3(b) acts on the resin-made holding member 10, and the claw of the member holding section 13 is disengaged. As a result, fitting with the image forming apparatus is released, and the toner cartridge 20 is removed from the image forming apparatus.

As is apparent from this description, the spring portion 11 provided on the resin-made holding member 10 extends when the toner cartridge 20 is removed from the image forming apparatus main body. Otherwise, it continues to push the grip 24 in the arrow-marked direction shown in FIG. 3(b).

As shown in FIG. 4, the toner cartridge 20 has a buffer chamber 26 adjacent to the aforementioned development roller 25, and a hopper 27 adjacent to the buffer chamber 26.

The development roller 25 includes a conductive cylindrical substrate and an elastic layer formed by using a hard substance such as a silicone rubber on the substrate.

The blade 28 as a toner regulating member is arranged on the buffer chamber 26 and the blade 28 is being pressed against the development roller 25. The blade 28 is used to regulate the amount of static charge and the amount of toner deposition on the development roller 25. Further, to assist regulation of the amount of static charge and amount of toner deposition on the development roller 25, an auxiliary blade 29 can be further provided on the downstream side of the blade 28 with reference to the rotating direction of the development roller 25.

A supply roller 30 is pressed against the development roller 25. The supply roller 30 is driven by a motor (not illustrated) in the same direction as the development roller 25 (in the counterclockwise direction of the drawing). The supply roller 30 has a conductive cylindrical substrate and a foamed layer made up of an urethane foam arranged on the outer periphery of the substrate.

The hopper 27 incorporates toner T as a single-component developer. Further, the hopper 27 is provided with a rotary member 31 for agitating the toner T. The rotary member 31 is provided with a film-shaped conveyance blade. The toner T is conveyed by the rotation of the rotary member 31 in the arrow-marked direction. The toner T conveyed by the conveyance blade is supplied to the buffer chamber 26 through the passage 32 provided on the partition separating between the hopper 27 and buffer chamber 26. The conveyance blade is shaped in such a way that the blade bends while conveying the toner T on the forward side in the rotating direction of the blade by the rotation of the rotary member 31 and the blade goes back to the original straight form, upon arrival at the left end of the passage 32. As is apparent from this description, the blade changes its shape from a curved to a straight form, whereby the toner T is supplied to the passage 32.

Further, the passage 32 is provided with a valve 321 for closing the passage 32. This valve is a film-shaped member, with one end of the valve being fixed on the upper right side surface of the passage 32 of the partition. When the toner T has been supplied to the passage 28 from the hopper 27, the passage 32 is opened by the rightward pressure of toner T, with the result that toner T is supplied to the buffer chamber 26.

The other end of the valve 321 is provided with a regulating member 322. The regulating member 322 and supply roller 30 is arranged in such a way that a slight gap is formed even when the passage 32 is blocked by the valve 321. The regulating member 322 is used to regulate the amount of toner remaining at the bottom of the buffer chamber 26 not to be excessive. It is adjusted so that a great amount of the toner T collected to the supply roller 30 from the development roller 25 does not fall on the bottom of the buffer chamber 26.

In the toner cartridge 20, development roller 25 rotates in the arrow-marked direction at the time of image formation, and the toner in the buffer chamber 26 is supplied onto the development roller 25 by the rotation of the supply roller 30. The toner T supplied onto the development roller 25 is electrically charged and made into a thin layer by the blade 28 and auxiliary blade 29. After that, the toner is fed to the area opposing to the image carrier, and is used for development of an electrostatic latent image on the image carrier. The portion of the toner not employed for development is fed back to the buffer chamber 26 by the rotation of the development roller 25, and is scraped off from the development roller 25 by the supply roller 30, whereby it is collected.

FIGS. 5(a) and 5(b) are schematic diagrams showing the holding member using a metallic coil spring in a conventional art. In a holding member 110 shown in FIGS. 5(a) and 5(b), the metallic coil spring is mounted on the spring installation portion 120 of the holder portion 112, and the member is held by the member holding section 113 formed between the mounted coil spring 111 and holder portion 112. In the holding member 110 shown in FIGS. 5(a) and 5(b), a metallic coil spring is used in the spring portion. When the holding member 110 is manufactured, it is necessary to form the holder portion 112 and to mount a coil spring on the holder portion 112. By contrast, in the resin-made holding member of the present invention, a spring portion 11 and holder portion 12 integrally combined into one piece can be produced by molding of a resin material.

Thus, the holding member of the present invention eliminates the mounting work of the metallic coil spring when manufacturing the holding member 110 of FIGS. 5(a) and 5(b), and ensures quick production of the holding member 10 without consuming much time and labor. Further, it can be produced only by the resin material, and this procedure can reduce the number of parts required to manufacture the holding member 10.

EXAMPLE

The following describes the present invention with reference to Examples. However, it is to be understood that the present invention is not restricted thereto.

1. Manufacturing a Holding Member Sample

The holding member sample having the form shown in FIGS. 1(a) and 1(b) was manufactured by injection molding method, using various resin materials commercially available on the market characterized by the Young's modulus, tensile yield stress and compressive tensile stress shown in Table 1. It should be noted that abbreviations for the resin material in Table 1 represent the following resin products:

POM: Polyoxymethylene resin
HIPS: High impact polystyrene resin
ABS: Acrylonitrile butadiene styrene copolymer resin
PC: Polycarbonate resin In various types of holding member materials, molds were designed to determine and provide the wall thicknesses of the ends 17 and region 18 of the spring portion 11, the vertical width and longitudinal distance of the hollow section 16, and the curved surfaces on the ends 17 and connections 19.

The Young's modulus of the various types of resin materials was measured by the Model UCT-5T Tensilon Universal Tester by Orientech Co., Ltd., using a dumbbell No. 1 test piece (ASTM D638 Type I) produced by N100 molding machine by Japan Steel Works, Ltd. The tensile yield strength of the resin material was measured according to the "Plastic material tensile test method" of JIS K7113, using a test piece 1A specified in the JIS K7162. The compressive yield strength of the resin material was measured according to the JIS K7208, "Plastic material compression test method", using a compression test piece specified in JIS K7181.

The manufactured holding member samples having the shape of FIGS. 1(a) and 1(b) were assigned with Examples 1 through 9 and Comparative Examples 2 through 6. The shape of ends 17 satisfying the following equation was used.

$$t1 = t1(L) = t1(R)$$

As the Comparative Example 1, a coil spring was manufactured using a steel material having a diameter of 0.32 mm and this coil spring has a diameter of 2.2 mm, a total turns of 25 turns, a length of 18.6 mm and a spring constant of 0.3 N/mm. Then a holding member sample of FIGS. 5(a) and 5(b) was manufactured, wherein the aforementioned coil spring was mounted on the polyoxymethylene-made holder.

2. Evaluation Test (1) Evaluation of Holding Member Productivity

Each of three operators produced holding members for 15 minutes using an injection molding machine and by manual work. The productivity was evaluated according to the number of the holding members (number per person) manufactured during this time. To put it more specifically, the work done by the operators included the work of removing burrs from resin portions, and the work of mounting the coil spring for the Comparative Example.

A: 300 (piece per person) or more
B: 100 (pieces per person) through 299 (pieces per person)
C: less than 100 (pieces per person)

(2) Evaluation of Holding Member Durability

As shown in FIGS. 3(a) and 3(b), each of the holding member having been manufactured was mounted at a predetermined position of the toner cartridge. The operation of mounting and dismounting the toner cartridge on the image forming apparatus was repeated 1000 times. Durability was evaluated according to the feel at the time of installation of the toner carriage and the state of the mounted toner cartridge being secured subsequent to the test of mounting and dismounting operations.

A: Firm and reliable mounting was felt, and the mounted toner cartridge did not move.
B: A certain degree of looseness was felt at the time of mounting, but the mounted toner cartridge did not move.
C: Looseness was felt at the time of mounting, and the mounted toner cartridge moved.

Table 1 shows the test results

TABLE 1

| | Shape of holding member | Resin material performance | | | Wall thickness of elastic piece 15 | | | Size of hollow section 16 | | Existence of curved surface | | Evaluation result | |
|---|---|---|---|---|---|---|---|---|---|---|---|---|---|
| | | Material | Young's modulus (MPa) | Tensile yield stress (MPa) | Compressive yield stress (MPa) | End 17 (t1) (mm) | Part 18 (t2) (mm) | t1/t2 | Vertical Width (L1) (mm) | Longitudinal distance (L2) (mm) | L2/L1 | End of elastic piece | Connection | Productivity | Durability |
| Exam. 1 | FIG. 1 | POM | 2600 | 65 | 90 | 2.0 | 1.3 | 1.5 | 2.15 | 23.65 | 11 | Yes | Yes | A | A |
| Exam. 2 | FIG. 1 | HIPS | 2300 | 25 | 40 | 2.0 | 1.3 | 1.5 | 2.15 | 23.65 | 11 | Yes | Yes | A | A |
| Exam. 3 | FIG. 1 | ABS | 2000 | 44 | 65 | 2.0 | 1.3 | 1.5 | 2.15 | 23.65 | 11 | Yes | Yes | A | A |

TABLE 1-continued

Figure 5:
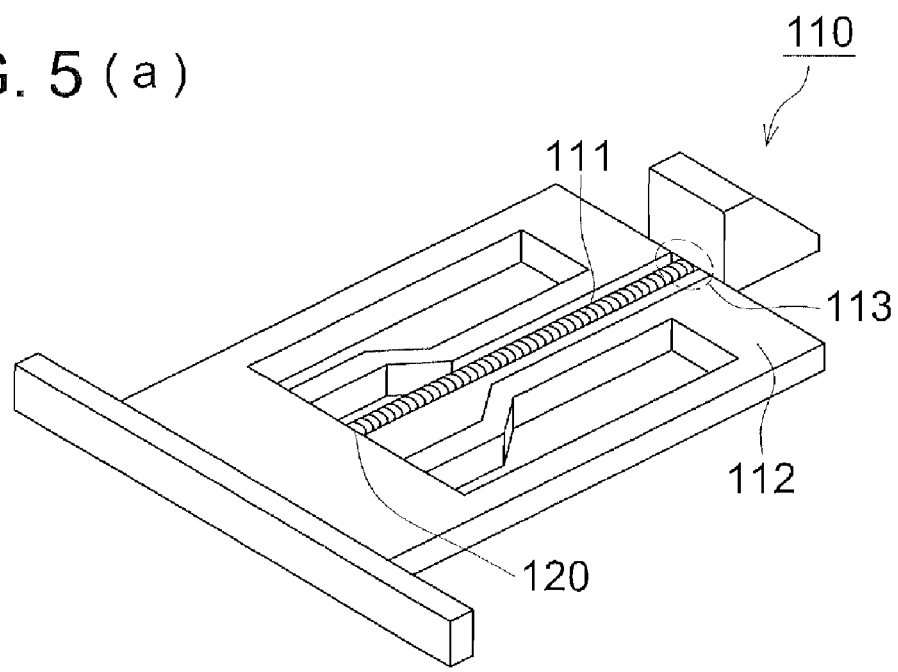
FIGS. 5(a) and 5(b) are schematic diagrams showing an example of the holding member using a metallic coil spring.
Figure 5:
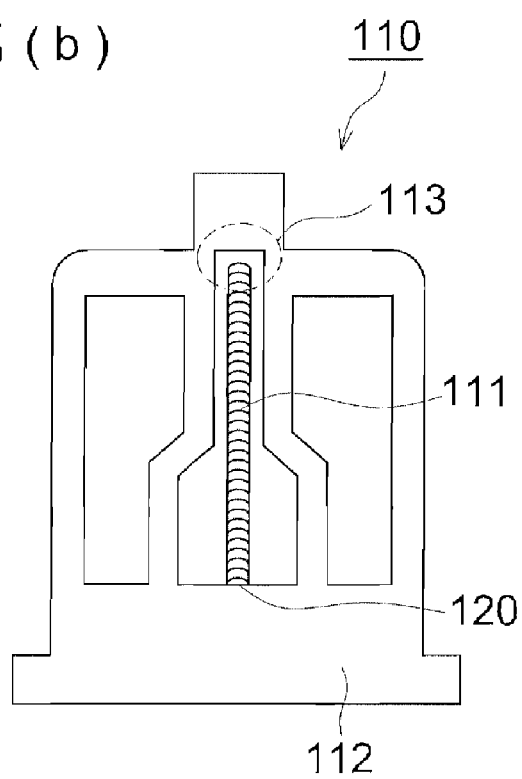

| | Shape of holding member | Material | Resin material performance | | | Wall thickness of elastic piece 15 | | | Size of hollow section 16 | | | Existence of curved surface | | Evaluation result | |
| | | | Young's modulus (MPa) | Tensile yield stress (MPa) | Compressive yield stress (MPa) | End 17 (t1) (mm) | Part 18 (t2) (mm) | t1/t2 | Vertical Width (L1) (mm) | Longitudinal distance (L2) (mm) | L2/L1 | End of elastic piece | Connection | Productivity | Durability |
|---|---|---|---|---|---|---|---|---|---|---|---|---|---|---|---|
| Exam. 4 | FIG. 1 | PC | 2200 | 60 | 100 | 2.0 | 1.3 | 1.5 | 2.15 | 23.65 | 11 | Yes | Yes | A | A |
| Exam. 5 | FIG. 1 | POM | 2600 | 65 | 90 | 2.0 | 1.8 | 1.1 | 2.15 | 23.65 | 11 | Yes | Yes | A | B |
| Exam. 6 | FIG. 1 | POM | 2600 | 65 | 90 | 2.4 | 0.8 | 3.0 | 2.15 | 23.65 | 11 | Yes | Yes | B | B |
| Exam. 7 | FIG. 1 | POM | 2600 | 65 | 90 | 2.0 | 1.3 | 1.5 | 4.30 | 25.80 | 6 | Yes | Yes | B | B |
| Exam. 8 | FIG. 1 | POM | 2600 | 65 | 90 | 2.0 | 1.3 | 1.5 | 1.85 | 29.60 | 16 | Yes | Yes | A | B |
| Exam. 9 | FIG. 1 | POM | 2600 | 65 | 90 | 2.0 | 1.3 | 1.5 | 2.15 | 23.65 | 11 | No | No | B | B |
| Comp. 1 | FIG. 5 | POM | 2600 | 65 | 90 | — | — | — | — | — | — — | — | | C | A |
| Comp. 2 | FIG. 1 | POM | 2600 | 65 | 90 | 1.3 | 1.3 | 1.0 | 2.15 | 23.65 | 11 | Yes | Yes | A | C |
| Comp. 3 | FIG. 1 | HIPS | 2300 | 25 | 40 | 1.0 | 1.3 | 0.7 | 2.15 | 23.65 | 11 | Yes | Yes | C | C |
| Comp. 4 | FIG. 1 | POM | 2600 | 65 | 90 | 1.3 | 1.3 | 1.0 | 2.15 | 23.65 | 11 | No | No | C | C |
| Comp. 5 | FIG. 1 | POM | 2600 | 65 | 90 | 1.3 | 1.3 | 1.0 | 2.15 | 23.65 | 11 | No | Yes | B | C |
| Comp. 6 | FIG. 1 | POM | 2600 | 65 | 90 | 1.3 | 1.3 | 1.0 | 2.15 | 23.65 | 11 | Yes | No | B | C |

Exam.: Example
Comp.: Comparative example

As shown in FIG. 1, it has been demonstrated that, according to the Examples 1 through 9 corresponding to the holding member of the present invention, it is possible to produce a resin-made holding member characterized by excellent durability and reduced production time and labor. Thus, the advantages of the present invention can be sufficiently obtained. By sharp contrast, it has been shown that, according to the Comparative Examples 1 through 6, much production time and labor were required to install the coil spring and to remove the burrs from the ends 17. From the viewpoint of durability, the results of Comparative Examples 2 through 6 have been confirmed to be inferior to those of the Examples 1 through 9. In the track-shaped elastic piece constituting the spring, it has been shown that the advantages of the present invention cannot be obtained if the average wall thickness on both ends of the track-shape long axial direction was not larger than the average wall thickness of other portions.

The present invention provides a resin-made holding member wherein a predetermined stable holding performance is maintained for a long period of time without the spring being damaged when used for a long duration with the spring contracted by force. Thus, as compared with the conventional holding member using a metallic coil spring, there is no need of using plural types of materials. Further, the resin-made holding member of the present invention can be manufactured by molding of resin, whereby a substantial improvement has been achieved in the productivity of the holding member.

What is claimed is:

1. A resin-made holding member composed of a spring and a holder which are integrated with each other into one piece, wherein the spring is formed of a plurality of ring-shaped elastic pieces connected with one another, and wherein each of the elastic pieces is formed so that an average of wall thickness of both ends in a longest axis direction of an inner diameter of a ring shape is greater than an average of wall thickness of other portions.

2. The resin-made holding member of claim 1, wherein a following relationship is satisfied, assuming that the average of wall thickness of both ends is t1, and the average of wall thickness of other portions is t2:

$1.0 < t1/t2 \leq 3.0$.

3. The resin-made holding member of claim 1, wherein a hollow portion constituting each of the elastic pieces satisfies a following relationship, assuming that a longest diameter of inner diameters is L2, and an average length of inner diameters perpendicular to a direction of the longest diameter of inner diameters is L1:

$5 \leq L2/L1 \leq 15$.

4. The resin-made holding member of claim 1, wherein Young's modulus of a resin material used for the resin-made holding member is 2000 through 2600 MPa.

5. The resin-made holding member of claim 1, wherein tensile yield strength of a resin material used for the resin-made holding member is 25 through 65 MPa.

6. The resin-made holding member of claim 1, wherein compressive yield strength of a resin material used for the resin-made holding member is 40 through 100 MPa.

7. The resin-made holding member of claim 1, wherein a resin material used for the resin-made holding member includes at least one of polypropylene, high-density polyethylene, low-density polyethylene, high-impact polystyrene, acrylonitrile butadiene styrene copolymer, polyoxymethylene, and polycarbonate.

8. The resin-made holding member of claim 1, which is integrally made into one piece by at least one of injection molding, cutting of a resin solid and using of a press machine.

9. The resin-made holding member of claim 1, wherein the ends of the elastic pieces are formed to have a curved surface.

10. The resin-made holding member of claim 1, wherein a connection for linking the elastic pieces is formed to have a curved surface.

11. A toner cartridge comprising:
a resin-made holding member composed of a spring and a holder which are integrated with each other into one piece,
wherein the spring is formed of a plurality of ring-shaped elastic pieces connected with one another, and wherein each of the elastic pieces is formed so that an average of wall thickness of both ends in a longest axis direction of an inner diameter of a ring shape is greater than an average of wall thickness of other portions.

12. A toner cartridge of claim 11, wherein the resin-made holding member is fixed to the toner cartridge while a member holding section of the resin-made holding member is fitted with a projection on the toner cartridge.

13. A toner cartridge of claim 11, which is held on an image forming apparatus by pressing a grip of the toner cartridge with an end of the holder of the resin-made holding member.

14. A toner cartridge of claim 11, which can be used in an upside down position.

15. A toner cartridge of claim 11, wherein the resin-made holding member is used in a contracted condition.

* * * * *